United States Patent [19]
Nakamura et al.

[11] Patent Number: 5,908,897
[45] Date of Patent: Jun. 1, 1999

[54] SILICONE RUBBER COMPOSITION

[75] Inventors: Akito Nakamura; Yoshito Ushio, both of Chiba Prefecture, Japan

[73] Assignee: Dow Corning Toray Silicone Co., Ltd., Tokyo, Japan

[21] Appl. No.: 08/666,113

[22] Filed: Jun. 19, 1996

[30]     Foreign Application Priority Data

Jun. 21, 1995 [JP] Japan ................................ 7-178196

[51] Int. Cl.$^6$ .......................... C08J 83/05; C08K 3/34
[52] U.S. Cl. ........................... 524/862; 524/861; 528/24
[58] Field of Search ..................... 524/862, 861; 528/24

[56]         References Cited

U.S. PATENT DOCUMENTS

| | | | |
|---|---|---|---|
| 4,766,170 | 8/1988 | Honma et al. | 524/500 |
| 4,771,099 | 9/1988 | Itoh et al. | 524/862 |
| 5,002,807 | 3/1991 | Fujimura et al. | 427/387 |
| 5,051,465 | 9/1991 | Yoshida et al. | 524/588 |

FOREIGN PATENT DOCUMENTS

| | | |
|---|---|---|
| 40050 | 4/1978 | Japan . |
| 41252 | 4/1981 | Japan . |
| 300962 | 10/1992 | Japan . |

*Primary Examiner*—Robert Dawson
*Assistant Examiner*—D. Aylward
*Attorney, Agent, or Firm*—William F. Boley; Jennifer S. Warren

[57]          ABSTRACT

A silicone rubber composition that yields silicone rubber whose durometer can be freely reduced without a concomitant reduction in the mechanical properties of the silicone rubber. The reduction in durometer is achieved by controlling the concentration of an organosiloxane having hydrogen substitution on terminal silicon atoms.

14 Claims, 1 Drawing Sheet

SILICONE RUBBER COMPOSITION

BACKGROUND OF THE INVENTION

This invention relates to organoperoxide-curing silicone rubber compositions. More particularly, this invention relates to a silicone rubber composition that yields silicone rubber whose durometer can be freely reduced without a concomitant reduction in the mechanical properties of the silicone rubber.

Organoperoxide-curing silicone rubber compositions cure rapidly when heated to yield cold-resistant and heat-resistant silicone rubber. A general tactic employed here consists of the admixture of SiH-containing organopolysiloxane into these silicone rubber compositions in order to inhibit discoloration during cure (Japanese Patent Application Laid Open [Kokai] Numbers Sho 53-40050 [40,050/1978] and Hei 4-300962 [300,962/1992]), to improve the tear strength of the silicone rubber (Japanese Patent Application Laid Open [Kokai] Number Sho 56-41252 [41,252/1981]), to improve the fatigue resistance of the silicone rubber (Japanese Patent Application Laid Open [Kokai] Number Sho 62-197454 [197,454/1987]), and to reduce the surface tack of the silicone rubber (Japanese Patent Application Laid Open [Kokai or Unexamined] Numbers Sho 63-130663 [130,663/1988] and Hei 2-124977 [124,977/1990]). In order to improve the described properties, however, organohydrogenpolysiloxane or organohydrogencyclosiloxane containing at least 3 SiH per molecule is typically used, which causes such properties in the silicone rubber as the durometer and tensile strength to increase in value. At the same time, with respect to the silicone rubber compositions used to form packings, gaskets, tubing, and the fixing and pressure rolls in copiers and printers, the durometer of the silicone rubbers afforded by these compositions must be rigorously controlled. The durometer can be adjusted downward, for example, by blending a non-crosslinking silicone oil into the precursor silicone rubber composition. Another method for adjusting the durometer downward consists of preparing silicone rubber with the desired durometer by blending two different silicone rubber compositions—one that forms silicone rubber with a durometer below the desired value and one that forms silicone rubber with a durometer above the desired value—in freely selected proportions The former method requires that large amounts of non-crosslinking silicone oil be admixed to achieve a reduction in the durometer of the silicone rubber. This creates problems such as a reduction in the mechanical strength of the resulting silicone rubber and bleed-out of the silicone oil from the silicone rubber. The existence of these problems has caused the latter method to be the method in general use. This notwithstanding, the latter method requires the preliminary preparation of at least two different silicone rubber compositions and also requires skill to prepare a silicone rubber with the desired durometer without impairing the mechanical properties.

The object of the present invention is to provide a silicone rubber composition that yields silicone rubber whose durometer can be freely reduced as desired without a concomitant reduction in the mechanical properties of the silicone rubber.

SUMMARY OF INVENTION

The introduction of a silicone rubber composition that yields silicone rubber whose durometer can be freely reduced without a concomitant reduction in the mechanical properties of the silicone rubber. The reduction in durometer is achieved by controlling the concentration of an organosiloxane having hydrogen substitution on terminal silicon atoms.

DESCRIPTION OF INVENTION

Figure 1:
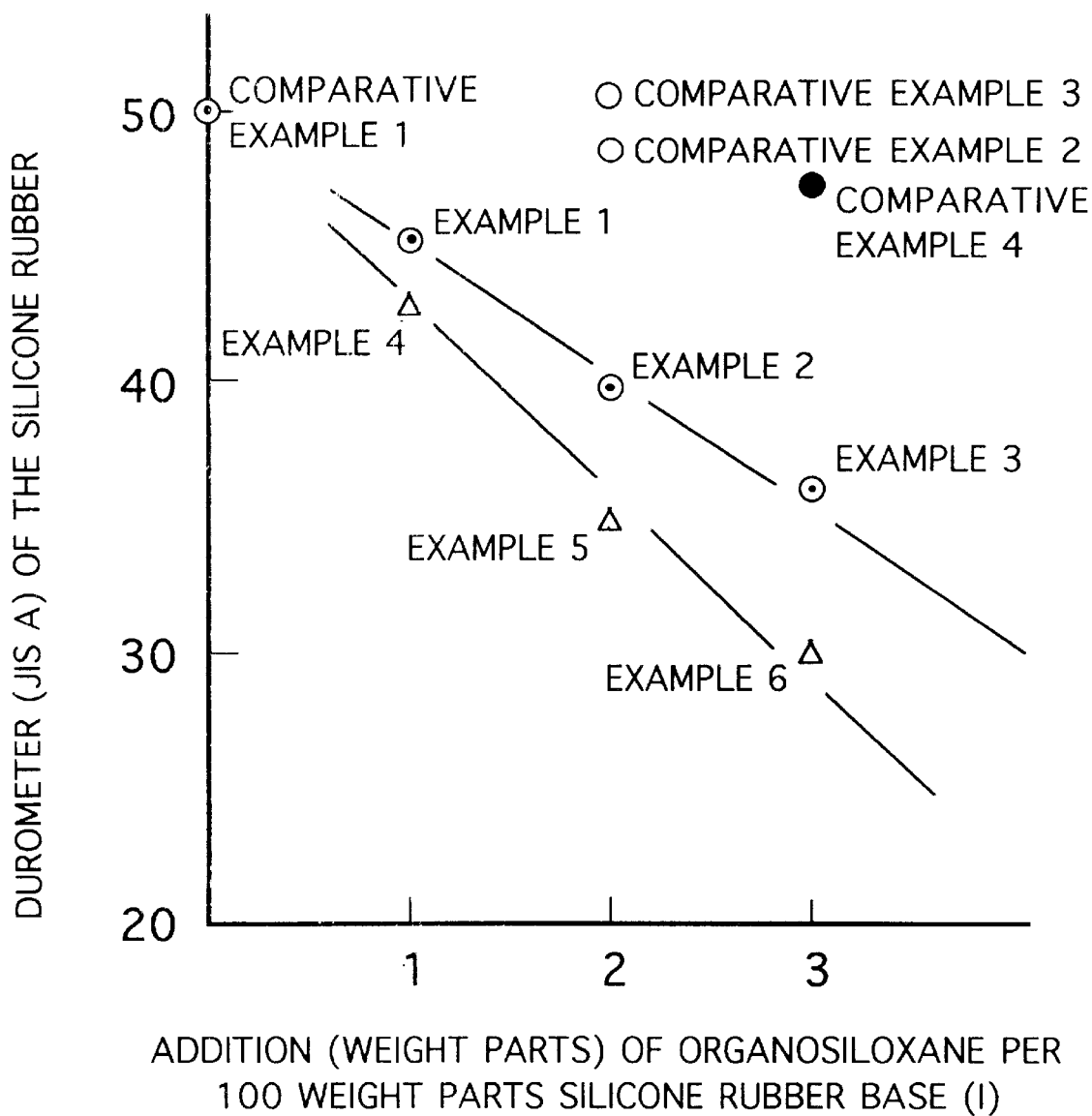
FIG. 1 shows the variation in the durometer of the silicone rubbers of Examples 1 to 6 and Comparative Examples 1 to 4 as a function of the organosiloxane addition.

The invention relates to a silicone rubber composition comprising (A) 100 weight parts organopolysiloxane with the average unit formula

wherein $R^1$ represents substituted and unsubstituted monovalent hydrocarbon groups and a is from 1.8 to 2.3, (B) 0 to 600 weight parts inorganic filler, (C) 0.1 to 50 weight parts organosiloxane with the general formula

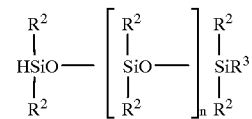

in which $R^2$ represents alkyl groups, $R^3$ is selected from a group consisting of hydrogen atom, hydroxyl group, and alkyl group, and n is a number from 0 to 100, and (D) 0.1 to 10 weight parts organoperoxide.

The silicone rubber composition according to the present invention will be explained in detail in the following. The organopolysiloxane (A), which is the main or base component of the present composition, is defined by the average unit formula $R^1{}_a SiO_{(4-a)/2}$. $R^1$ in this formula represents substituted and unsubstituted monovalent hydrocarbon groups and is exemplified by alkyl groups such as methyl, ethyl, propyl, butyl, pentyl, and hexyl; alkenyl groups such as vinyl, allyl, butenyl, pentenyl, and hexenyl; aryl groups such as phenyl, tolyl, xylyl, and naphthyl; cycloalkyl groups such as cyclopentyl, and cyclohexyl; aralkyl groups such as benzyl and phenethyl; and haloalkyl groups such as 3-chloropropyl and 3,3,3-trifluoropropyl. Methyl, vinyl, phenyl, and 3,3,3-trifluoropropyl are specifically preferred. At least one $R^1$ is preferably vinyl since this affords a lower compression set for the ultimately obtained silicone rubber. The subscript a in the preceding formula is a number in the range of from 1.8 to 2.3. The molecular structure of component (A) is exemplified by straight-chain, partially branched straight-chain, and branched-chain structures with straight-chain structures being preferred. Component (A) is a polymer substantially composed of the $R^1{}_2SiO_{2/2}$ unit which may also contain as additional siloxane units small amounts of the $R^1{}_3SiO_{1/2}$ unit and/or $R^1{}_2(HO)SiO_{1/2}$ unit, and, depending on the particular circumstances, small amounts of the $R^1SiO_{3/2}$ unit and/or $SiO_{4/2}$ unit. The subject component (A) may either be a polymer constituted of the described siloxane units or a mixture of two or more different polymers of this type. From a practical standpoint component (A) preferably has a degree of polymerization of at least 1,000.

The component (A) under consideration is exemplified by the following:
trimethylsiloxy-endblocked dimethylpolysiloxanes,
trimethylsiloxy-endblocked dimethylsiloxane-methylvinylsiloxane copolymers,
trimethylsiloxy-endblocked methylphenylpolysiloxanes,
trimethylsiloxy-endblocked dimethylsiloxane-methylphenylsiloxane copolymers,
trimethylsiloxy-endblocked dimethylsiloxane-methyl(3,3,3-trifluoropropyl)siloxane copolymers,
trimethylsiloxy-endblocked dimethylsiloxane-methylvinylsiloxane-methylphenylsiloxane copolymers,
dimethylvinylsiloxy-endblocked dimethylpolysiloxanes,
dimethylvinylsiloxy-endblocked dimethylsiloxane-methylvinylsiloxane copolymers,
dimethylvinylsiloxy-endblocked methylphenylpolysiloxanes,
dimethylvinylsiloxy-endblocked dimethylsiloxane-methylphenylsiloxane copolymers,
dimethylvinylsiloxy-endblocked dimethylsiloxane-methyl(3,3,3-trifluoropropyl)siloxane copolymers,
dimethylvinylsiloxy-endblocked dimethylsiloxane-methylvinylsiloxane-methylphenylsiloxane copolymers,
silanol-endblocked dimethylpolysiloxanes,
silanol-endblocked dimethylsiloxane-methylvinylsiloxane copolymers,
silanol-endblocked methylphenylpolysiloxanes,
silanol-endblocked dimethylsiloxane-methylphenylsiloxane copolymers,
silanol-endblocked dimethylsiloxane-methyl(3,3,3-trifluoropropyl)siloxane copolymers, and
silanol-endblocked dimethylsiloxane-methylvinylsiloxane-methylphenylsiloxane copolymers, The inorganic filler (B) is an optional component that may be added for the purpose of, for example, providing the silicone rubber created by curing the composition with an acceptable mechanical strength, heat resistance, weather resistance, chemical resistance, flame retardancy, and thermal conductivity. Component (B) is specifically exemplified by fumed silica, wet-process silica, fumed titanium oxide, calcined silica, fused silica, quartz, titanium oxide, aluminum oxide, magnesium oxide, zinc oxide, cerium oxide, iron oxide, aluminum hydroxide, zinc carbonate, magnesium carbonate, calcium carbonate, diatomaceous earth, calcium silicate, magnesium silicate, aluminum silicate, mica, talc, clay, bentonite, silicon nitride, aluminum nitride, boron nitride, silicon carbide, ground glass, glass fiber, carbon black, graphite, silver powder, nickel powder, and the inorganic fillers afforded by hydrophobicizing the surface of the preceding with an organosilicon compound such as an organoalkoxysilane, organochlorosilane, organosilazane, organopolysiloxane, organocyclosiloxane, and so forth. Component (B) may consist of a single inorganic filler or a mixture of 2 or more different inorganic fillers.

Component (B) should be added at no more than 600 weight parts per 100 weight parts component (A) and is preferably added at from 5 to 500 weight parts per 100 weight parts component (A). The use of more than 600 weight parts component (B) per 100 weight parts component (A) yields a silicone rubber composition with a very poor extrudability and processability.

The organosiloxane (C) is the component that provides the capacity to lower the durometer of the silicone rubber as desired without at the same time lowering the mechanical properties of the rubber. This component is defined by the following general formula.

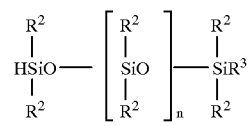

$R^2$ in this formula represents alkyl groups, for example, methyl, ethyl, propyl, butyl, pentyl, and hexyl, wherein methyl is particularly preferred. $R^3$ in the preceding formula is the hydrogen atom, a hydroxyl group, or an alkyl group wherein the alkyl groups encompassed by $R^3$ are exemplified by the alkyl groups just listed above. The hydrogen atom is specifically preferred for $R^3$. The subscript n in the subject formula is a number from 0 to 100 and is preferably a number from 1 to 20.

Component (C) is added in general at from 0.1 to 50 weight parts and preferably at from 0.1 to 20 weight parts, in each case per 100 weight parts component (A). A reduction in the durometer of the ultimately obtained silicone rubber cannot be induced when component (C) is used at less than 0.1 weight part per 100 weight parts component (A). The use of more than 50 weight parts results in such problems as bleed-out by component (C) from the ultimately obtained silicone rubber and diminished mechanical properties by the silicone rubber.

The organoperoxide (D) functions as curing agent for the present composition. Component (D) is exemplified by hydroperoxides such as tert-butyl hydroperoxide, cumene hydroperoxide, diisopropylbenzene hydroperoxide, p-menthane hydroperoxide, 2,5-dimethyl-2,5-dihydroperoxyhexane, 2,5-dimethyl-2,5-dihydroperoxy-3-hexyne, and pinene hydroperoxide; dialkyl peroxides such as diisobutyl peroxide, di-tert-butyl peroxide, di-tert-amyl peroxide, tert-butyl cumyl peroxide, dicumyl peroxide, 2,5-dimethyl-2,5-di(tert-butylperoxy)hexane, 2,5-dimethyl-2,5-di(tert-butylperoxy)-3-hexyne, alpha,alpha'-bis(tert-butylperoxy)-di(iso butylperoxy)benzene, 1,1-bis(tertbutylperoxy)-3,3,5-trimethylcyclohexane, n-butyl 4,4'-bis(tertbutylperoxy)valerate, 2,2-bis(4,4-di-tert-butylperoxycyclohexyl)propane, 2,2-bis(tert-butylperoxy)butane, and 1,1-di(tert-butylperoxy)cyclohexane; diacyl peroxides such as decanoyl peroxide, lauroyl peroxide, stearoyl peroxide, succinyl peroxide, benzoyl peroxide, p-chlorobenzoyl peroxide, o-chlorobenzoyl peroxide, 2,4-dichlorobenzoyl peroxide, and octanoyl peroxide; peroxy esters such as tert-butyl peroxyacetate, tert-butyl peroxy-2-ethylhexanoate, tert-butyl peroxylaurate, tert-butyl peroxybenzoate, di-tert-butyl diperoxyphthalate, 2,5-dimethyl-2,5-di(benzoylperoxy)hexane, tert-butylperoxymaleic acid, tert-butylperoxyisopropyl carbonate, tert-butylperoxypivalate, and tert-butylperoxy neodecanoate; peroxy dicarbonates such as diisopropyl peroxydicarbonate and di-2-ethylhexyl peroxydicarbonate; and ketone peroxide. Dialkyl peroxides are preferred for component (D) because they give silicone rubber with a lower compression set. Component (D) can be a single organoperoxide or a mixture of two or more different organoperoxides. When component (D) cannot be mixed to homogeneity into component (A), component (D) is preferably preliminarily mixed into a low-viscosity organopolysiloxane to give a paste and this paste is then mixed into component (A).

Component (D) should be added at from 0.1 to 10 weight parts per 100 weight parts component (A) and is preferably added at from 0.5 to 5 weight parts per 100 weight parts component (A). The silicone rubber composition will have a strongly diminished curability when it contains less than 0.1 weight part component (D) per 100 weight parts component (A). The use of more than 10 weight parts component (D) provides little additional effect and thus is uneconomical.

The following, for example, may be admixed into the present composition as optional components insofar as the object of the present invention is not impaired: organic fillers such as carbon fiber, polyester fiber, polytetrafluoroethylene resin powder, and polyvinyl chloride resin powder, and those organic fillers whose surface has been hydrophobicized by treatment with an organosilicon compound such as an organoalkoxysilane, organochlorosilane, organosilazane, organopolysiloxane, or organocyclosiloxane; adhesion promoters such as 3-mercaptopropyltrimethoxysilane, 3-mercaptopropylmethyldimethoxysilane, N-(2-aminoethyl)-3-aminopropyltrimethoxysilane, N-(2-aminoethyl)-3-aminopropylmethyldimethoxysilane, 3-aminopropyltrimethoxysilane, 3-aminopropyltriethoxysilane, 3-methacryloxypropyltrimethoxysilane, 3-methacryloxypropylmethyldimethoxysilane, 3-glycidoxypropyltrimethoxysilane, 3-glycidoxypropylmethyldimethoxysilane, 2-(3,4-epoxycyclohexyl)ethyltrimethoxysilane, vinyltrimethoxysilane, and allyltrimethoxysilane; heat stabilizers such as cerium silanolate, cerium salts of fatty acids, iron octylate, and barium zirconate; flame retardants such as benzotriazole, zinc carbonate, manganese carbonate, platinum compounds, and antimony oxide; plasticizers such as phthalate esters, adipate esters, maleate esters, fumarate esters, and phosphate esters; process aids such as stearic acid, sodium stearate, fatty acid esters, and fatty acid amides; and low-viscosity organopolysiloxanes.

The composition under consideration can be prepared by mixing the above-described components (A) to (D) and any optional components to homogeneity using a mixer such as a kneader mixer, Banbury mixer, or two-roll mill. In one method for preparing this composition provided by way of example, components (A) and (B) are mixed to homogeneity with a kneader mixer or Banbury mixer to give a silicone rubber base and components (C) and (D) are then blended to homogeneity into this silicone rubber base using a two-roll mill. The durometer of the ultimately obtained silicone rubber can be adjusted as desired by varying the addition of component (C) to the composition over the range from 0.1 to 50 weight parts per 100 weight parts component (A). The component (C) addition required to give silicone rubber having a particular desired durometer can be readily determined by preliminary measurement of the durometer of silicone rubber obtained by curing the silicone rubber composition comprising components (A), (B), (D), and any optional components and the durometer of silicone rubber obtained by the addition to this composition of specific amounts of component (C).

The composition under consideration cures rapidly at temperatures at or above the decomposition temperature of component (D), for example, at 130° C.to 250° C., to form silicone rubber having a durometer selected as desired. As a result, this composition is ideal for use as a molding material for packings, gaskets, tubing, and the fixing rolls and pressure rolls in copiers and printers.

The silicone rubber composition according to the present invention will be explained in greater detail below using working examples. The methods of JIS (Japanese Industrial Standard) K 6301, "Physical Testing Methods for Vulcanized Rubber", were used to measure the durometer (JIS A), tensile strength, and compression set (treatment temperature=180° C., compression time =22 hours) of the silicone rubbers. The thermal conductivity of the silicone rubbers was measured using a Shortherm QTM instrument (nonsteady-state hot wire method) from Showa Denko Kabushiki Kaisha.

REFERENCE EXAMPLE 1

Using a kneader mixer, the following were first mixed to homogeneity and were then mixed for 2 hours while heating at 170° C.:100 weight parts trimethylsiloxy-endblocked dimethylsiloxane-methylvinylsiloxane copolymer (average degree of polymerization=3,000, moles dimethylsiloxane unit:moles methylvinylsiloxane unit=99.84:0.16), 45 weight parts wet-process silica micropowder (bulk density=70 g/L), and 5 weight parts silanol-endblocked dimethylpolysiloxane (viscosity at 25° C.=30 mPa·s) as surface-treatment agent for the silica micropowder. The addition of 1 weight part 2,5-dimethyl-2,5-di(tert-butylperoxy)hexane to the resulting mixture with mixing to homogeneity then yielded a silicone rubber base (I).

REFERENCE EXAMPLE 2

Using a kneader mixer, the following were first mixed to homogeneity and were then mixed for 2 hours while heating at 170° C.:100 weight parts trimethylsiloxy-endblocked dimethylsiloxane-methylvinylsiloxane copolymer (average degree of polymerization=3,000, moles dimethylsiloxane unit :moles methylvinylsiloxane unit=99.70:0.30) and 200 weight parts aluminum oxide micropowder (average particle size=10 micrometers). The addition of 1.5 weight parts 2,5-dimethyl-2,5-di(tert-butylperoxy)hexane to the resulting mixture with mixing to homogeneity then yielded a silicone rubber base (II).

EXAMPLE 1

A silicone rubber composition was prepared by blending 1 weight part dimethylsiloxane oligomer with the formula

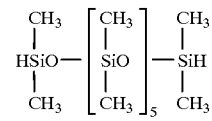

to homogeneity on a two-roll mill into 100 weight parts of the silicone rubber base (I) whose preparation is described in Reference Example 1. A 2 mm-thick silicone rubber sheet was molded by hot-pressing this silicone rubber composition for 10 minutes at 170° C. and 25 kgf/cm² The durometer and tensile strength of this silicone rubber were measured, and the results are reported in Table 1.

EXAMPLE 2

A silicone rubber composition was prepared as in Example 1, but in this case blending in 2 weight parts of the dimethylsiloxane oligomer that was used in Example 1. The silicone rubber was molded by curing the resulting silicone rubber composition as in Example 1. The durometer and tensile strength of this silicone rubber were measured, and the results are reported in Table 1.

EXAMPLE 3

A silicone rubber composition was prepared as in Example 1, but in this case blending in 3 weight parts of the dimethylsiloxane oligomer that was used in Example 1. The silicone rubber was molded by curing the resulting silicone rubber composition as in Example 1. The durometer and tensile strength of this silicone rubber were measured, and the results are reported in Table 1.

EXAMPLE 4

A silicone rubber composition was prepared by blending 1 weight part dimethylsiloxane oligomer with the formula

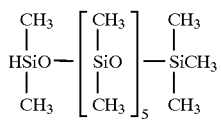

to homogeneity on a two-roll mill into 100 weight parts of the silicone rubber base (I) whose preparation is described in Reference Example 1. A 2 mm-thick silicone rubber sheet was molded by hot-pressing this silicone rubber composition for 10 minutes at 170° C.and 25 kgf/cm². The durometer and tensile strength of this silicone rubber were measured, and the results are reported in Table 1.

EXAMPLE 5

A silicone rubber composition was prepared as in Example 4, but in this case blending in 2 weight parts of the dimethylsiloxane oligomer that was used in Example 4. The silicone rubber was molded by curing the resulting silicone rubber composition as in Example 1. The durometer and tensile strength of this silicone rubber were measured, and the results are reported in Table 1.

EXAMPLE 6

A silicone rubber composition was prepared as in Example 4, but in this case blending in 3 weight parts of the dimethylsiloxane oligomer that was used in Example 4. The silicone rubber was molded by curing the resulting silicone rubber composition as in Example 1. The durometer and tensile strength of this silicone rubber were measured, and the results are reported in Table 1.

COMPARATIVE EXAMPLE 1

A 2 mm-thick silicone rubber sheet was molded by hot-pressing the silicone rubber base (I) whose preparation is described in Reference Example 1 for 10 minutes at 170° C.and 25 kgf/cm². The durometer and tensile strength of this silicone rubber were measured, and the results are reported in Table 1.

COMPARATIVE EXAMPLE 2

A silicone rubber composition was prepared by blending 2 weight parts tetra(dimethylhydrogensiloxy)silane with the formula

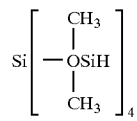

to homogeneity on a two-roll mill into 100 weight parts of the silicone rubber base (I) whose preparation is described in Reference Example 1. A 2 mm-thick silicone rubber sheet was molded by hot-pressing this silicone rubber composition for 10 minutes at 170° C.and 25 kgf/cm². The durometer and tensile strength of this silicone rubber were measured, and the results are reported in Table 1.

COMPARATIVE EXAMPLE 3

A silicone rubber composition was prepared by blending 2 weight parts dimethylsiloxane-methylhydrogensiloxane copolymer with the formula

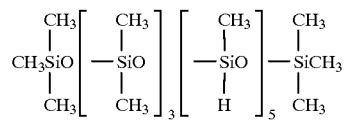

to homogeneity on a two-roll mill into 100 weight parts of the silicone rubber base (I) whose preparation is described in Reference Example 1
A 2 mm-thick silicone rubber sheet was molded by hot-pressing this silicone rubber composition for 10 minutes at 170° C.and 25 kgf/cm². The durometer and tensile strength of this silicone rubber were measured, and the results are reported in Table 1.

COMPARATIVE EXAMPLE 4

A silicone rubber composition was prepared by blending 3 weight parts trimethylsiloxy-endblocked dimethylpolysiloxane (viscosity=350 mPa·s) to homogeneity on a two-roll mill into 100 weight parts of the silicone rubber base (I) whose preparation is described in Reference Example 1. A 2 mm-thick silicone rubber sheet was molded by hot-pressing this silicone rubber composition for 10 minutes at 170° C.and 25 kgf/cm². The durometer and tensile strength of this silicone rubber were measured, and the results are reported in Table 1.

TABLE 1

| | Invention Example Number | | | | | | Comparative Example Number | | | |
|---|---|---|---|---|---|---|---|---|---|---|
| | 1 | 2 | 3 | 4 | 5 | 6 | 1 | 2 | 3 | 4 |
| Durometer (JIS A) | 45 | 40 | 36 | 43 | 35 | 30 | 50 | 48 | 50 | 47 |
| Tensile Strength (MPa) | 8.0 | 7.9 | 7.9 | 8.0 | 7.9 | 7.9 | 8.0 | 7.9 | 8.0 | 7.7 |

EXAMPLE 7

A silicone rubber composition was prepared by blending 2 weight parts dimethylsiloxane oligomer with the formula

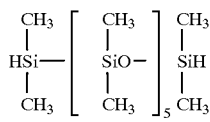

to homogeneity on a two-roll mill into 100 weight parts of the silicone rubber base (II) whose preparation is described in Reference Example 2. 2 mm-thick and 12 mm-thick silicone rubber sheets were molded by hot-pressing this silicone rubber composition for 10 minutes at 170° C.and 25 kgf/cm² followed by heating in a hot-air circulation oven for 4 hours at 200° C. The durometer, tensile strength, thermal conductivity, and compression set of this silicone rubber were measured, and the results are reported in Table 2.

EXAMPLE 8

A silicone rubber composition was prepared by blending 2 weight parts dimethylsiloxane oligomer with the formula

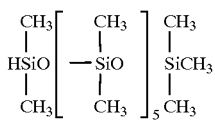

to homogeneity on a two-roll mill into 100 weight parts of the silicone rubber base (II) whose preparation is described in Reference Example 2. 2 mm-thick and 12 mm-thick silicone rubber sheets were molded by hot-pressing this silicone rubber composition for 10 minutes at 170° C.and 25 kgf/cm² followed by heating in a hot-air circulation oven for 4 hours at 200° C. The durometer, tensile strength, thermal conductivity, and compression set of this silicone rubber were measured, and the results are reported in Table 2.

COMPARATIVE EXAMPLE 5

2 mm-thick and 12 mm-thick silicone rubber sheets were molded by hot-pressing the silicone rubber base (II) whose preparation is described in Reference Example 2 for 10 minutes at 170° C.and 25 kgf/cm² followed by heating in a hot-air circulation oven for 4 hours at 200° C. The durometer, tensile strength, thermal conductivity, and compression set of this silicone rubber were measured, and the results are reported in Table 2.

COMPARATIVE EXAMPLE 6

A silicone rubber composition was prepared by blending 2 weight parts methylhydrogenpolysiloxane with the formula

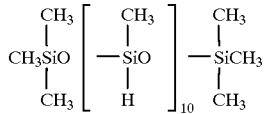

to homogeneity on a two-roll mill into 100 weight parts of the silicone rubber base (II) whose preparation is described in Reference Example 2. 2 mm-thick and 12 mm-thick silicone rubber sheets were molded by hot-pressing this silicone rubber composition for 10 minutes at 170° C.and 25 kgf/cm² followed by heating in a hot-air circulation oven for 4 hours at 200° C. The durometer, tensile strength, thermal conductivity, and compression set of this silicone rubber were measured, and the results are reported in Table 2.

COMPARATIVE EXAMPLE 7

A silicone rubber composition was prepared by blending 2 weight parts dimethylsiloxane-methylhydrogensiloxane copolymer with the formula

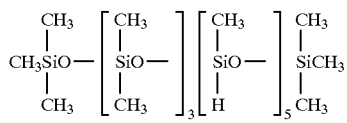

to homogeneity on a two-roll mill into 100 weight parts of the silicone rubber base (II) whose preparation is described in Reference Example 2. 2 mm-thick and 12 mm-thick silicone rubber sheets were molded by hot-pressing this silicone rubber composition for 10 minutes at 170° C.and 25 kgf/cm² followed by heating in a hot-air circulation oven for 4 hours at 200° C. The durometer, tensile strength, thermal conductivity, and compression set of this silicone rubber were measured, and the results are reported in Table 2.

TABLE 2

|  | Invention Examples Numbers | | Comparative Examples Numbers | | |
| --- | --- | --- | --- | --- | --- |
|  | 7 | 8 | 5 | 6 | 7 |
| Durometer (JIS A) | 50 | 45 | 60 | 61 | 59 |
| Tensile Strength (MPa) | 4.1 | 4.0 | 4.0 | 4.1 | 4.0 |
| Thermal Conductivity (X 10⁻³ cal/cm-sec° C.) | 1.68 | 1.69 | 1.67 | 1.68 | 1.68 |
| Compression Set (%) | 16 | 15 | 15 | 14 | 15 |

I claim:
1. A silicone rubber composition comprising
   (A) 100 weight parts organopolysiloxane with the average unit formula

wherein $R^1$ represents substituted and unsubstituted monovalent hydrocarbon groups and a is from 1.8 to 2.3,
   (B) 0 to 600 weight parts inorganic filler,
   (C) 0.1 to 50 weight parts organosiloxane with the general formula

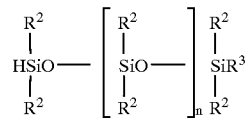

were $R^2$ represents alkyl groups, $R^3$ is selected from a group consisting of hydroxy group and alkyl group, and n is an integer from 0 to 100, and
   (D) 0.1 to 10 weight parts organoperoxide.
2. A silicone rubber composition according to claim 1, where each $R^1$ is independently selected from a group consisting of ethyl, vinyl, phenyl, and 3,3,3-trifluoropropyl.
3. A silicone rubber composition according to claim 1, where the organopolysiloxane is a straight-chain structure.
4. A silicone rubber composition according to claim 1, where the organopolysiloxane has a degree of polymerization of at least 1,000.
5. A silicone rubber composition according to claim 1 comprising 5 to 500 weight parts of the inorganic filler per 100 weight parts of the organopolysiloxane.
6. A silicone rubber composition according to claim 1, where $R^2$ is methyl.
7. A silicone rubber composition according to claim 1, where subscript n is a number from 1 to 20.
8. A silicone rubber composition according to claim 1 comprising from 0.1 to 20 weight parts of the organosiloxane per 100 weight parts of the organopolysiloxane.
9. A silicone rubber composition according to claim 1, where the organoperoxide is a dialkyl peroxide.
10. A silicone rubber composition according to claim 1 comprising from 0.5 to 5 weight parts of the organoperoxide per 100 weight parts of the organopolysiloxane.
11. A silicone rubber composition according to claim 1, where $R^2$ is methyl and $R^3$ is methyl.
12. A silicone rubber composition according to claim 11, where n is 5.
13. A silicone rubber composition according to claim 1, where $R^1$ is methyl, the organopolysiloxane has a degree of polymerization of at least 1,000, $R^2$ is methyl and $R^3$ is selected from a group consisting of hydrogen atom and methyl, the composition comprising 0.1 to 20 weight parts of the organosiloxane per 100 weight parts of the organopolysiloxane.

14. A silicone rubber composition comprising (A) 100 weight parts organopolysiloxane with the average unit formula

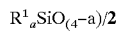

herein $R^1$ represents substituted and unsubstituted monovalent hydrocarbon groups and a is from 1.8 to 2.3, (B) 0 to 600 weight parts inorganic filler, (C) 0.1 to 50 weight parts organosiloxane with the general formula

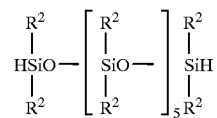

where $R^2$ represents methyl, and (D) 0.1 to 10 weight parts organoperoxide.

* * * * *